United States Patent
Candelore et al.

(10) Patent No.: US 12,482,485 B2
(45) Date of Patent: Nov. 25, 2025

(54) RESPONSIVE NOISE CANCELATION OVERRIDE

(71) Applicant: Sony Group Corporation, Tokyo (JP)

(72) Inventors: Brant Candelore, Poway, CA (US); Mahyar Nejat, La Jolla, CA (US)

(73) Assignee: SONY GROUP CORPORATION, Tokyo (JP)

( * ) Notice: Subject to any disclaimer, the term of this patent is extended or adjusted under 35 U.S.C. 154(b) by 282 days.

(21) Appl. No.: 18/209,376

(22) Filed: Jun. 13, 2023

(65) Prior Publication Data
US 2024/0420727 A1   Dec. 19, 2024

(51) Int. Cl.
| | |
|---|---|
| *G10L 25/78* | (2013.01) |
| *G10L 17/06* | (2013.01) |
| *G10L 17/20* | (2013.01) |
| *G10L 25/51* | (2013.01) |
| *H04R 3/00* | (2006.01) |

(52) U.S. Cl.
CPC ............. *G10L 25/78* (2013.01); *G10L 17/06* (2013.01); *G10L 17/20* (2013.01); *G10L 25/51* (2013.01); *H04R 3/00* (2013.01)

(58) Field of Classification Search
CPC ......... G10L 25/78; G10L 17/06; G10L 17/20; G10L 25/51; H04R 3/00; G10K 2210/1081; G10K 11/17823; G10K 11/17837
See application file for complete search history.

(56) References Cited

U.S. PATENT DOCUMENTS

| | | | |
|---|---|---|---|
| 6,906,632 B2* | 6/2005 | DeLine | B60R 11/0217 381/86 |
| 9,398,367 B1* | 7/2016 | Scott | H04R 1/1083 |
| 9,723,381 B2 | 8/2017 | Swanson | |
| 10,129,633 B1* | 11/2018 | Patil | G08B 13/19663 |
| 11,416,530 B1* | 8/2022 | Chandrashekar | H04N 21/8549 |
| 11,606,606 B1* | 3/2023 | Doken | H04N 21/47217 |
| 2002/0141599 A1* | 10/2002 | Trajkovic | G10K 11/17873 381/72 |
| 2008/0089530 A1* | 4/2008 | Bostick | H03G 3/32 381/74 |
| 2009/0082071 A1* | 3/2009 | Hicks, III | G10K 11/17821 455/575.2 |

(Continued)

FOREIGN PATENT DOCUMENTS

| | | |
|---|---|---|
| WO | WO-2019074883 A1 | 4/2019 |
| WO | WO-2022066393 A1 | 3/2022 |
| WO | WO2023277948 | 1/2023 |

*Primary Examiner* — Fariba Sirjani
(74) *Attorney, Agent, or Firm* — Trellis IP Law Group, PC (57) ABSTRACT

A noise cancelation override system is provided to enables a listener to consume audio content using noise cancelation technology without concern that the listener will miss external noises that require attention. The override system identifies external noise in the environment of the listener that is in need of the attention of the listener and overrides an activated noise canceling mode of a personal listening device. Signals and data from the environment of the listener are collected by microphone(s) and/or sensor(s) of the override system to assess various external noises for attention features. In some instances, an attention feature may be associated with characteristic(s) of the listener and/or environmental characteristics of the location of the listener.

19 Claims, 6 Drawing Sheets

(56) References Cited

U.S. PATENT DOCUMENTS

| | | | |
|---|---|---|---|
| 2017/0359467 A1* | 12/2017 | Norris | H04S 7/302 |
| 2018/0249250 A1* | 8/2018 | Pate | G06F 3/165 |
| 2018/0302738 A1* | 10/2018 | Di Censo | G06F 3/011 |
| 2018/0336000 A1* | 11/2018 | Vaughn | H04R 1/1083 |
| 2018/0374470 A1 | 12/2018 | Sarkar | |
| 2020/0135163 A1 | 4/2020 | Lovitt | |
| 2020/0260186 A1* | 8/2020 | Stachura | G10L 15/30 |
| 2020/0296521 A1* | 9/2020 | Wexler | G06F 3/167 |
| 2020/0351550 A1 | 11/2020 | Korupolu | |
| 2021/0168491 A1* | 6/2021 | Usher | G10L 15/00 |
| 2021/0397407 A1* | 12/2021 | Eubank | G06V 40/174 |
| 2022/0020387 A1* | 1/2022 | Paquier | G06N 20/00 |
| 2022/0091674 A1* | 3/2022 | Kemmerer | G10K 11/17837 |
| 2022/0159403 A1* | 5/2022 | Sporer | H04S 7/302 |
| 2022/0261218 A1* | 8/2022 | Shin | G06F 3/165 |
| 2023/0031536 A1 | 2/2023 | Lee | |
| 2023/0229383 A1* | 7/2023 | Kemmerer | G06F 3/167 |
| 2023/0315378 A1* | 10/2023 | Marchant | G06F 3/0346 715/727 |
| 2024/0080386 A1* | 3/2024 | Pillitteri | G06F 3/167 |
| 2024/0249711 A1* | 7/2024 | Laaksonen | G10K 11/17837 |
| 2024/0282327 A1* | 8/2024 | Mohammad | G06N 3/0442 |
| 2024/0395258 A1* | 11/2024 | Hiray | G10L 15/22 |
| 2024/0419390 A1* | 12/2024 | Candelore | H04R 1/1041 |
| 2024/0420727 A1* | 12/2024 | Candelore | G10L 25/51 |

\* cited by examiner

RESPONSIVE NOISE CANCELATION OVERRIDE

CROSS REFERENCES TO RELATED APPLICATIONS

This application is related to the following applications which are hereby incorporated by reference as if set forth in full in this application for all purposes:
U.S. patent application Ser. No. 18/209,365, entitled AUDIO SKIP BACK RESPONSE TO NOISE INTERFERENCE (020699-123300US), filed on Jun. 13, 2023; and
U.S. patent application Ser. No. 18/209,382, entitled, NOISE DETECTION FOR SKIP BACK OF AUDIO (20699-123700US), filed on Jun. 13, 2023.

BACKGROUND

Audio players include a variety of devices to provide audio content, including spoken word audio and music. With the advent of portable audio players, listeners are free to multitask by consuming audio content, while performing other activities, such as walking, exercising, driving, riding, and the like. Some audio players communicate with personal listening devices, for example, headphones, earbuds, and hearing aids that direct audio to the ear of a listener.

At times, noises from the environment may compete with outputted audio content, making it difficult for a listener to hear or understand the audio content. In some situations, noise canceling technology may be employed to block out environmental noise, enabling the listener to only or mostly hear the outputted audio content. A noise canceling mode of listening devices can stop any external sounds from leaking to the listener. Certain external noises may require attention from the listener, while other external noises may be ignored by the listener.

Some noise cancelation technology use active type functionality by erasing lower frequency sound waves. Active noise cancelation typically employs circuitry that senses microphone input to determine wave frequency/amplitude and creates a new wave out of phase with the noise waves.

SUMMARY

The present noise cancelation override system (also called "override system" or "system") enables adaptive deactivation of a noise cancelation operation of a personal listening device in response to identifying particular noises outside of the system that requires listener attention. The override system can assess microphone signals (which can include sound waves) and sensor data for signs of that listener attention is required, and trigger noise cancelation override, accordingly. For instance, microphone signals may enable detection of volume level of a particular external noise, which can be contrasted with output volume of the audio content, other noises in the environment, and/or a lack of detected noise in the environment. Loudness level comparisons may be used to determine that the particular external noise is interfering or potentially interfering with the audio content. Image sensor data of the surroundings of the listener acquired by a camera coupled to a personal listening device may also be assessed for attention features associated with an external noise.

A method is provided for noise identification to trigger responsive override of noise cancelation for personal listening devices. The method includes providing audio content to a personal listening device for output to a listener while the personal listening device is in a noise cancelation mode. Microphone signals and/or sensor data of at least one aspect of an environment of the listener are received to detect one or more external noises. Assessment of the signals and data enables determination of whether the signals and/or data include least one attention feature. In some implementations, one or more attention features may be associated with a listener characteristic and another of the at least one attention feature may be associated with an environmental characteristic of the listener surroundings. The attention feature(s) are the basis to identify attention requiring noises from the external noises examined. When an attention requiring noise is identified, the system can deactivate the noise cancelation mode.

Various attention features may be detected from external noises. For example, a loudness level of the attention requiring noise may be used in the identification. The attention feature may be related listener characteristic that can be selected from a group of: listener demographics, affiliated groups, hearing capability, listener habits or interests, and combinations thereof. At times, the microphone signals may represent multiple external noises in the environment and individual loudness levels of the multiple external noises may be detected based, at least in part, on the microphone signals. A particular one of the external noise may be identified as having a loudness level that meets a threshold volume level above the respective loudness levels of the other external noises of the multiple external noises. Data, such as a recording or microphone data of the particular external noise, may be inputted into a large language model (LLM) to perform natural language analysis and output a prediction that the particular external noise includes an attention feature that is specifically directed to the listener that requires the attention of the listener.

In some aspects of the method, the environment of the listener may be monitored for the presence of noise and the system may detect when a void of noise in the environment occurs for a predefine previous time immediately prior to detecting the particular external noise. In such cases, the identification of the attention requiring noise may use the LLM to find that the particular noise is includes a second feature that requires attention of the listener. In addition to or instead of microphone signals or data, the override system may use in the identification process, sensor data that includes one or more images of one or more cameras coupled to the personal listening device. The override system may perform or acquire the results of image recognition on the one or more images to identify an object and/or a gesture in the environment. In this manner, the object and/or the gesture may be determined to indicate that the particular external noise includes the attention requiring noise. In some implementations, such gestures can includes a person distant from the listener mouthing speech. The speech of the person by recognizing movement of lips, face and/or tongue of the person and an attention artificial intelligence (AI) model can calculate that the predicted speech indicates that the particular external noise includes the attention requiring noise.

In some implementations, the override system may determine a wait period in which to pause reactivation of the noise canceling mode. The attention requiring noise can be detected to have ceased based, at least in part, on the microphone signals and after the wait period the noise canceling mode can be reactivated the personal listening device.

In still some implementations, a determination may be made that the particular external noise is speech of a particular person in a location of the listener. Further to identifying the attention requiring noise, detection may be made that the particular person speaks a threshold number of repetitions within a predefined period of time.

In some aspects of the method, a voice notification of a deactivation mode may be provided to the personal listening device for output to the listener, upon initiating deactivation. Such voice notification may include a description of a type of the attention requiring noise.

In some implementations, an apparatus of a noise cancelation override system is provided, which is configured for attention requiring noise identification to trigger playback of audio content. The apparatus includes one or more processors and logic encoded in one or more non-transitory media for execution by the one or more processors and when executed operable to perform various operations as described above in terms of the method.

In some implementations, a non-transitory computer-readable storage medium is provided which carries program instructions for attention requiring noise identification to trigger playback of audio content. These instructions when executed by one or more processors cause the one or more processors to perform operations as described above for the method.

A further understanding of the nature and the advantages of particular embodiments disclosed herein may be realized by reference of the remaining portions of the specification and the attached drawings.

BRIEF DESCRIPTION OF THE DRAWINGS

The disclosure is illustrated by way of example, and not by way of limitation in the figures in which like reference numerals are used to refer to similar elements.

DETAILED DESCRIPTION OF EMBODIMENTS

The present noise cancelation override system enables a listener to consume audio content using noise cancelation technology without concern that the listener misses external noises that require attention. The override system identifies external noise in the environment of the listener that is in need of the attention of the listener and overrides an activated noise canceling mode of a personal listening device.

Signals and data representing detectable aspects of the environment of the listener are collected by microphone(s) and/or sensor(s) of the override system to assess various external noises for attention features. In some instances, an attention feature may be associated with characteristic(s) of the listener and/or environmental characteristics of the location of the listener. At times, attention requiring noises may be identified with use of microphone signals without any sensor data. At other times, both microphone signals and sensor data may be both considered in the identification. At still other times, only sensor data may be employed as a forewarning of an impending attention requiring noise.

Some attention features extracted from the microphone signals may be associated with loudness of a particular noise being evaluated as potentially being an attention requiring noise. For example, the volume of a particular external noise may be contrasted with environmental characteristics of other noises in the environment including a lack of detected noise in the environment.

In some circumstances, image sensor data of the surroundings of the listener may be captured by camera(s) coupled to a personal listening device. This sensor data may also be assessed for attention features associated with the particular external noise under evaluation. At times, the external noise may be identified by image data captured prior to capture of noise via the microphone signals or prior to the noise being heard by the listener. In some implementations, assessment of the image data may include lip reading by the override system of speech of a person other than the listener in the environment. In some implementations, an artificial intelligence (AI) model, such as a large language model (LLM) may be employed to recognize speech in the environment of the listener that requires the listeners attention. The AI model may be trained on attention requiring speech that may be generally encountered or specifically encountered based on characteristics of the listener.

A "listener" as used in this description, refers to one or more users that consume audio content outputted by the override system. The listener may listen to the audio outputted via a personal listening device or directly from an audio player.

Personal listening devices (also referred to as "portable listening devices" or "directed listening devices") direct audio to the ears of the listener. For the purposes of this description, personal listening devices for use in the override system, have active noise cancelation capabilities (e.g., active type of headphone, earbuds, and hearing aid Such devices can include headphones, earbuds, over-the-counter hearing aids, hearables, headsets, bone conduction wearables, sound beaming technology to focus audio through a space to ears of a listener, other advancements in personal listening devices including future technologies, and so on.

Personal listening devices often pair with audio players, including audio playing software, that provide a source of the audio content. For example, some hearing aids can connect with a smartphone, tablet, or computer for the user to listen to audio content. However, some personal listening devices can also include an integrated audio source without communicating with a separate audio player. In general, personal listening devices can allow for screen-free playing of audio content.

Although personal listening devices are described, it should be understood that the noise cancelation override system may also be applied to other listening devices that have active noise cancelation capabilities. Other listening devices may include audio players coupled to or integrated with various electronic devices including multi-purposes electronic devices, such as a smartphone, computer, vehicle, home smart speakers, am/fm receiver, television audio channel, internet connected device, etc.

Environmental characteristics includes features in the location of the listener other than the particular external noise being evaluated as an attention requiring noise. Examples of location-based environmental characteristics may include location type, types of other noises typically present or detected as being present, a type of noise that frequently requires attention in the location, etc. Hazard-based environmental characteristics may include a level of danger associated with the environment, such as a listener crossing a busy street. Composition-based environmental characteristics describes aspects of the make-up of the environment, such as density of other people in the environment, whether other people in the environment are stationary or passing through the environment, etc.

Some location-based environmental characteristics may generally correspond with an identified type of location, such as a library or doctor's waiting room being known to be quiet, a bus station or downtown city streets being known as having many noises. In some situations, the location-based environmental characteristics may be paired with temporal aspects to identify both location and time of the listener. For example, a bus station late at night may be characterized as quiet, whereas the same bus station may be characterized as being noisy during the middle of the day.

In some implementations, listener characteristics may also be used to determine attention features of the noises from the sensor/microphone data and signals. Listener characteristics may include demographics of the listener (such as age, nationality, occupation, family members, place of residence (e.g., address, city, state, county), education, language the listener speaks, etc.). Listener characteristics may also include habits or interests of the listener, such as places the listener frequently goes to, groups to which the listener affiliates, athletic clubs, activities. Other listener characteristics may be considered such as hearing related challenges or disabilities, etc.

Some attention features may be associated with characteristics of the listener to determine speech directed to a particular listener. For example, variations of names of the listener (including nicknames, formal names, etc.), hearing capability of the listener including physical, mental and/or emotional challenges, acquaintances of the listener, familiar environments frequented by the listener and noises typical of the familiar environments, groups to which the listener associates (referred to as "affiliated groups"), etc. For example, a name of a group to which the listener belongs may be an attention feature such that detecting the name of the group along with detection of additional attention features, such as a specific loudness level, may trigger deactivation of the noise cancelation. In some implementations, the system may access a calendar or schedule of the listener. Listener characteristics may be collected and used by the override system with prior permissions of the listener and according to applicable privacy policies and regulations.

The noise cancelation override system is beneficial for a listener of audio content to avoid missing important sounds and events occurring in the environment of the listener. The listener is available to switch attention from the audio content to environmental noises. It can be burdensome for the listener to manually pause the audio content while exposed to an attention requiring noise and/or replay missed content.

The present override system addresses these problems with other systems and have additional benefits.

Figure 1:
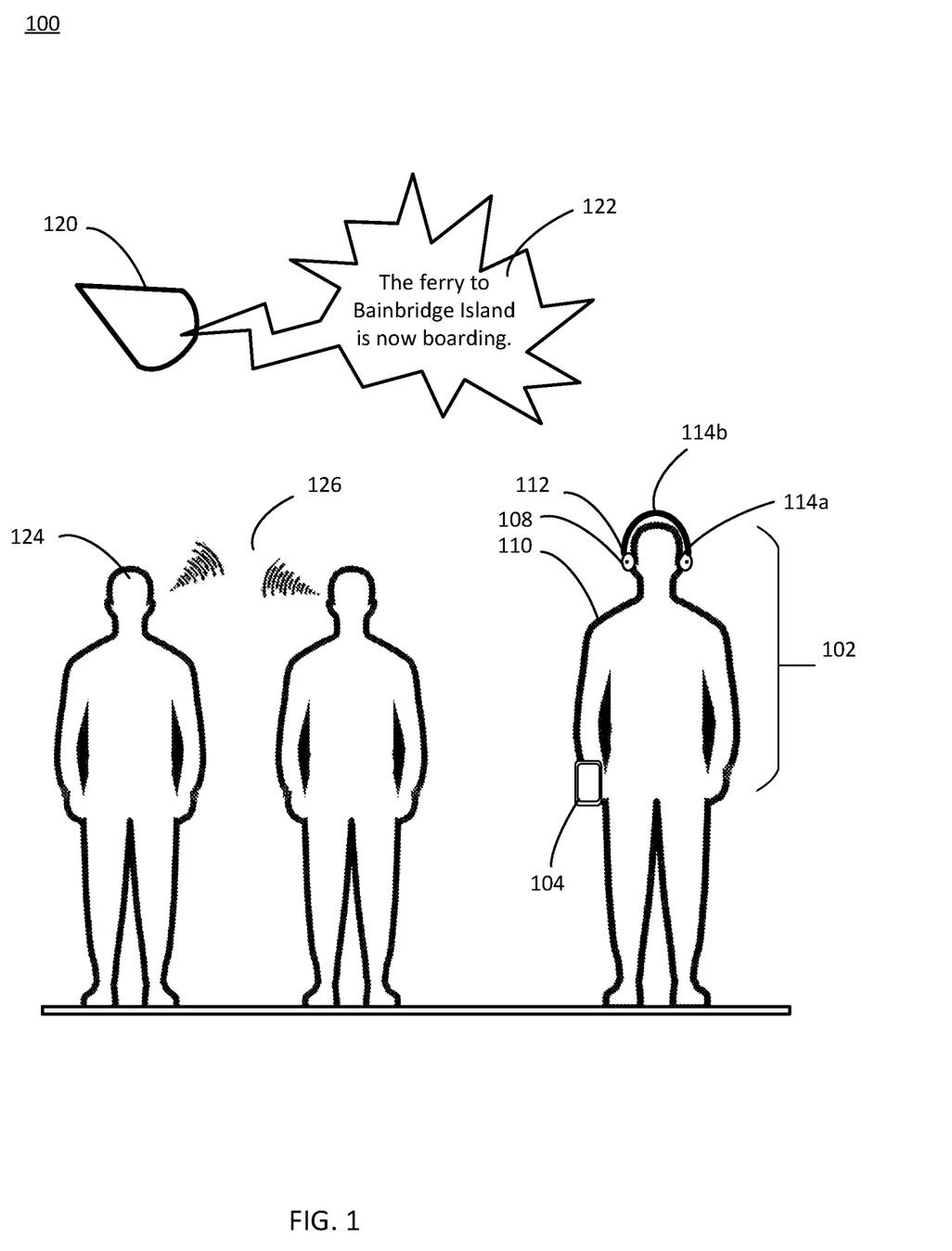
FIG. 1 is a conceptual diagram illustrating an example setting in which various aspects of a noise cancelation override system can be implemented, in accordance with some implementations.

FIG. 1 is an illustration of an environment 100 in which a noise cancelation override system 102 may be used to collect environmental signals and data and determine an interfering external noise that requires the listener's attention. The noise cancelation override system 102 includes an audio player 104. In the example of FIG. 1, the audio player 104 may be a smart phone, which may be in communication with a personal listening device 108, such as headphones on a listener 110. A microphone 112 and sensors 114a, 114b may be coupled to the headphones 108 to detect noise-related information from the environment. The headphones 108 includes multiple sensors including a side facing camera 114a over the ears and back and/or forward facing camera 114b on a strap of the headphones 108. The audio player determines that the noise is an attention requiring noise that requires deactivation of a noise canceling mode of the personal listening device. In some implementations, the microphone 112 may be coupled to the audio player 104 in addition to or instead of being coupled to the headphones 108.

The microphone 112 picks up noise on loud volume speech outputted from a speaker 120 announcing, "The ferry to Bainbridge Island is now boarding" 122. The microphone 112 also captures softer conversational talk 126 of two bystander 124. The noise cancelation override system identifies the announcement as attention noise that requires the attention of the listener based on attention features of the speech and the environment. For example, the loudness level of the announcement is compared to the volume of individual noises in the environment, including the conversation 126 of the bystanders 124. The loudness level of the announcement is found to be a threshold volume level above the loudness levels of the environmental noises.

The override system may further combine environmental characteristics of location at a ferry terminal with listener characteristics as a place that the listener frequents. The location and frequency of presence of the listener indicates that the announcement is attention requiring. Furthermore, a listener characteristic of place of residence on Bainbridge Island also factors into the identification of the announcement as attention noise. The override system uses an AI to identify attention features and predict combinations of the attention features as indicative of an attention noise that triggers deactivation of noise cancelation. The override system may be employed in a wide variety of other contexts and use cases.

Figure 2:
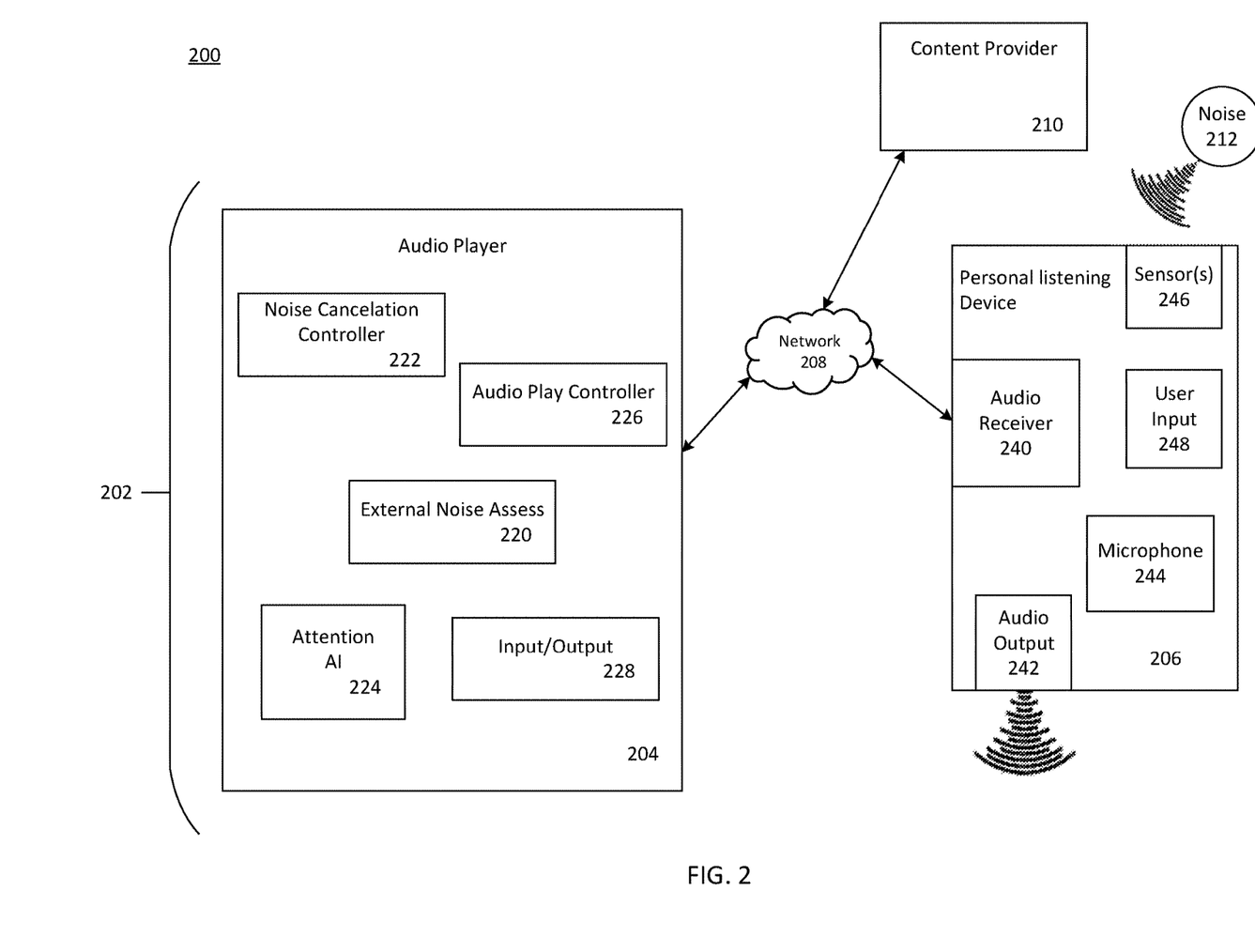
FIG. 2 is a block diagram of an example component environment that includes a noise cancelation override system, in accordance with some implementations.

FIG. 2 is an example block diagram of an environment 200 containing the noise cancelation override system 202 and other elements that enable operation of the override system 202. The noise cancelation override system 202 includes an audio player 204 that communicates with a personal listening device 206 across a network 208. Content provider 210 may provide prerecorded or live audio content to be received by the override system 202 for output to a listener.

The audio player 204 includes an external noise assessment module 220 to detect and evaluate attention features of the external noise and determine if a detected external noise 212 is indicative of an attention requiring noise to trigger deactivation of noise cancelation of the personal listening device 206, as described herein. The external noise 212 may be produced by any source of object, person (e.g., talk, scream, etc.), animal, nature, etc. The external noise 212 may be a continuous sound or pulses produced as regular short intervals. Noise that is noncontinuous may be considered a same noise for assessment as an attention requiring noise when the pause between sounds is within a defined short period of time, e.g. 1-10 seconds between bursts of a same type of noise.

The override system may the deactivate noise canceling mode, wait during a pause period of time after an external noise is ceases to be detected before reactivating the noise canceling mode. In a case of detection of an urgent event associated with the external noise, e.g., identified as urgent by comparison with stored sound data, the noise cancelation override system may use microphone signals and sensor data to determine that the urgent event has concluded prior reactivating the noise canceling mode. An external noise may be detected by the microphone and/or sensor(s) of the audio player, or of external devices such as the personal listening device 206, or other devices coupled to the audio player 204 or independent of the audio player 204.

In some implementations, the external noise assessment module 220 may assess sensor data including visual data for attention features in addition to or instead of audio data to determine if an attention requiring noise is imminent or present. Attention requiring features may include a loudness level of the noise. Determining whether an external noise is requiring of the listener attention may include measuring a volume of the external noise against a threshold volume, as described herein.

At times, a loudness level threshold amount may be defined based, at least in part, on other attention features, including a characteristic of the listener, such as hearing ability, in combination with environmental characteristics, such as the location of the listener, other noises in the environment, etc. For example, a greater loudness threshold may be set for an environment that is categorized as frequently having loud noises, which are considered louder than typical environments of the listener. In some implementations, environmental characteristics may be coupled with various listener characteristics, such as listener demographics, affiliated groups, hearing capability, listener habits or interests.

In some implementations, the noise assessment module 220 may detect that a particular external noise is a repetition of a same person speaking. If the repetitive speech occurs within a threshold number of repetitions (greater than a single time), the particular external noise may be identified as requiring listener attention. In some implementations, meeting of the repetition threshold may also be coupled with other attention features, such as a listener characteristic, e.g., speaker is a particular acquaintance such as a family member, caretaker, doctor, close friend, and the like, of the listener, for the noise assessment module 220 to identify the external noise as attention requiring.

In some implementations, external noise assessment 220 may include detecting sensor indicators, e.g., visual signals, natural language speech, etc., that may be interpreted by the override system as forewarning of an attention requiring noise about to occur. Some details of the identification of attention requiring noises is described below with regards to FIGS. 3-4.

In some implementations, an attention AI model 224 may be employed to predict that microphone signals of external noise is indicative of an attention requiring noise. The attention AI model 224 may be previously trained on natural language that is typical of an urgent event requiring attention, language that is specifically directed to the listener. In this manner the detection of attention requiring noise is not restricted to identifying key words. Instead natural language may be assessed on the fly for attention features.

Training of the attention AI model 224 is described in detail with regards to FIG. 5 below. The AI model may receive as input the microphone signals that had been detected and output identification of the attention requiring noise. In some implementations, the AI model further provides labels that indicate types of attention requiring noise, such as urgent event, listener directed speech, various pause periods, such as long, medium, or short pause periods, each associated with a predefined length of pause time, etc.

In some implementations, the AI model may be inputted with various attention features. Listener characteristics and environmental characteristics may be used by the AI model as factors to further predict attention requiring noises specific to the listener. Listener characteristics may be collected and used with prior permission of the listener and according to applicable privacy policies and regulations. The AI model can also output a category of the type of attention requiring noise.

In some implementations, the override system may skip back according to a predesignated time (e.g., 1-5 seconds) prior to the interruption. In some circumstances, a predesignated skip back time may be employed where a short portion of the audio content is missed, such as 1-5 seconds.

In some implementations, audio content paused or interrupted during the deactivation of noise cancelation, may be replayed at a determined skip back point for playback of the audio content. Such a skip back point is a place in the audio content after the beginning point from which the audio content was initially played during a listening session. In some implementations, the skip back point is a natural place in the audio content that, based on characteristic feature of the content, allow for a smooth transition for the listener. In some implementations, after the interfered portion of the audio content is replayed, the override system seamlessly continues to output the audio content, such as prerecorded content, from the point that was left off of previously un-played portions of the audio content. Further details and examples of determining a skip back point that may be employed by the noise cancelation override system, are described in U.S. patent application Ser. No. 18/209,365, entitled, AUDIO SKIP BACK RESPONSE TO NOISE INTERFERENCE, filed on Jun. 13, 2023, and U.S. patent application Ser. No. 18/209,382, entitled, NOISE DETECTION FOR SKIP BACK OF AUDIO, filed on Jun. 13, 2023, the contents of both are incorporated herein by reference.

A noise cancelation controller 222 of the audio player 204 may be included to deactivate and activate the noise canceling mode of the personal listening device. In some implementations, after deactivation of the noise canceling mode the system may monitor the presence of the attention requiring noise. Depending on the determined type of attention requiring noise, a wait period may be defined. For example, an attention requiring noise associated with an urgent event may impose a longer wait, such as 15 minutes to 30 minutes, than a non-nonurgent noise, such as 30 seconds to 5 minutes. Upon detection that the attention requiring noise ceases and the wait period has expired, the noise cancelation controller 222 initiating the noise canceling mode to reactivate the noise canceling function of the personal listening device.

An audio play controller 226 controls the output of the audio content, such as instructing the personal listening device 206 to play, pause, replay audio, playback audio content from a skip back point, and other controls, via input/output 228.

An input/output 228 to receiving and transmission, such as to/from content provider 210 and personal listening device 206 through network 208. The input/output 228 may also receive user input directly into the audio player.

In some implementations, a notification of a deactivation mode may be provided to the listener via the personal listening device upon initiating deactivation. The notification may be a voice notification, which in some instances, can include a description of a type or nature of the attention requiring noise. For example, the override system may announce to the listener that an urgent noise is present. The voice notification can also announce a name of a person speaking. In still some implementations, the system may provide a voice summary of the attention requiring noise, which may have been missed or partially missed by the listener, such as "your name was called." Such a noise summary may be created by natural language processing of the override system to interpret the noise and extract relevant parts for the listener.

The personal listening device 206 (also referred to as personal output device) may include an audio receiver 240. The audio content from the audio player 204 may be received by receiver 240 from audio player 204 or directly from content provider 210, and outputted to the listener via audio output 242.

A microphone 244 of the personal listening device 206 monitors the environment for external noise projected from an object 212 that may be in the immediate environment or away from the listener but with sufficient volume to be detected by the microphone. Monitoring for external noise may occur at various times, such as continuously when the personal listening device outputs audio content, when particular audio content is outputted, such as spoken word content, at regularly scheduled intervals, upon request of the listener, upon a triggering event, such as visual indicator of attention requiring noise as sensed by sensor 246, etc.

In some implementations, a sensor 246 may capture various sensor data from the environment of the listener that may be interpreted as including attention feature(s) that an attention requiring noise is occurring or about to occur. In some implementations, the sensor 246 includes one or more cameras coupled to the personal listening device 206. The camera(s) may face particular directions relative to the listener, such as front facing (same direction as the listener), back facing, one or more side facing, or alternating directions.

Other sensors 246 that may detect information indicative of a current or impending attention requiring noise may include ambient light sensor, accelerometer, gps, gyroscope, lidar (e.g., to detect distance from a noise source), magnetometer, proximity sensor (e.g., to detect a distance from a noise source). Some sensors may be employed to triangulate to a noise source and determine whether the source is nearby to the listener. In some implementations, one or more sensors of the audio player may also be employed to detect an external noises and attention features of the noises.

In still some implementations, a user input receiver 248 may be received commands or other input from the listener. For example, a listener may input a manual override play back to cancel the playback mode and continue outputting the content from the point of interruption. User input may be in the form of voice commands, such as "continue noise canceling", natural language commands, or gestures, such as tapping the device. The noise cancelation override system may be equipped with natural language assessment software to interpret a user voice commands using natural language. In this manner, the override system is not restricted to keyword commands.

Content provider 210 provides audio content that may be in various formats, such as digital prerecorded content, In some implementations, the content provider 210 may provide live audio content, such as a live showing or digital broadcast of a live event. Various audio content may be outputted by the override system, such as spoken word audio, music, nature sounds (such as a thunder storm), etc. Spoken word content may include various types such as poetry, audio drama, audiobooks, storytelling, non-musical dramas, sermons, narrations with or without music collaboration or accompaniment (where spoken word is the main focus of the content), and instructional recordings, podcasts, interviews, conversational, panel discussions, non-fictional news, stream of consciousness, repurposed content, etc.

Communication may employ any suitable electronic communication for travel across the communication path of network 208. One or more networks 208 may be used for one or two way communication and optionally one or more additional computing resources. The network 208 may connect devices using physical wires, such as cords, and/or also be wireless, such as WiFi, Bluetooth™, near field communication (NFC), etc. In some examples, the network 208 may include one or more cellular networks and/or the Internet, among other networks. In some examples, a local network such as a Bluetooth™ network is employed for communication between the mobile device and television. The network 208 could take other forms as well such as including one or more WANs (Wide-Area Networks) and/or LANs (Local-Area Networks). Typically, the communication path provided by the network 208 is configured for communication over a short distance, such between devices located on a same listener.

Where a wireless network 1208 is employed, the network may operate according to one or more communication protocols, such as Bluetooth™, LTE (Long-Term Evolution), CDMA (Code Division Multiple Access), WiMax (Worldwide Interoperability for Microwave Access), WiFi (Wireless Fidelity), WiFi Direct (Wireless Fidelity Direct), EDGE (Enhanced Data rates for GSM (Global System Mobile) Evolution), 3G (Third Generation), 4G (Fourth Generation), HTTP (Hyper-Text Transfer Protocol), TCP (Transmission Control Protocol), SIP (Session Initiation Protocol), device contact based transfer protocols, and other communication protocols.

Various other configurations of the noise cancelation override system 202 are possible. In some implementations, the audio player 204 may output audio content and/or notifications directly to the listener via speakers or other output components of the audio player 204 without employing the personal listening device. In such implementations, the components of the personal listening device 206 may be integrated with the audio player 204. In still some implementations, the personal listening device may integrate one or more components of the audio player 204. For example, headphones may include software modules to assess external noise 220, control noise cancelation 222, and/or control playback 226. In some implementations such smart headphones may avoid the need of a separate audio player 204 altogether.

Figure 3:
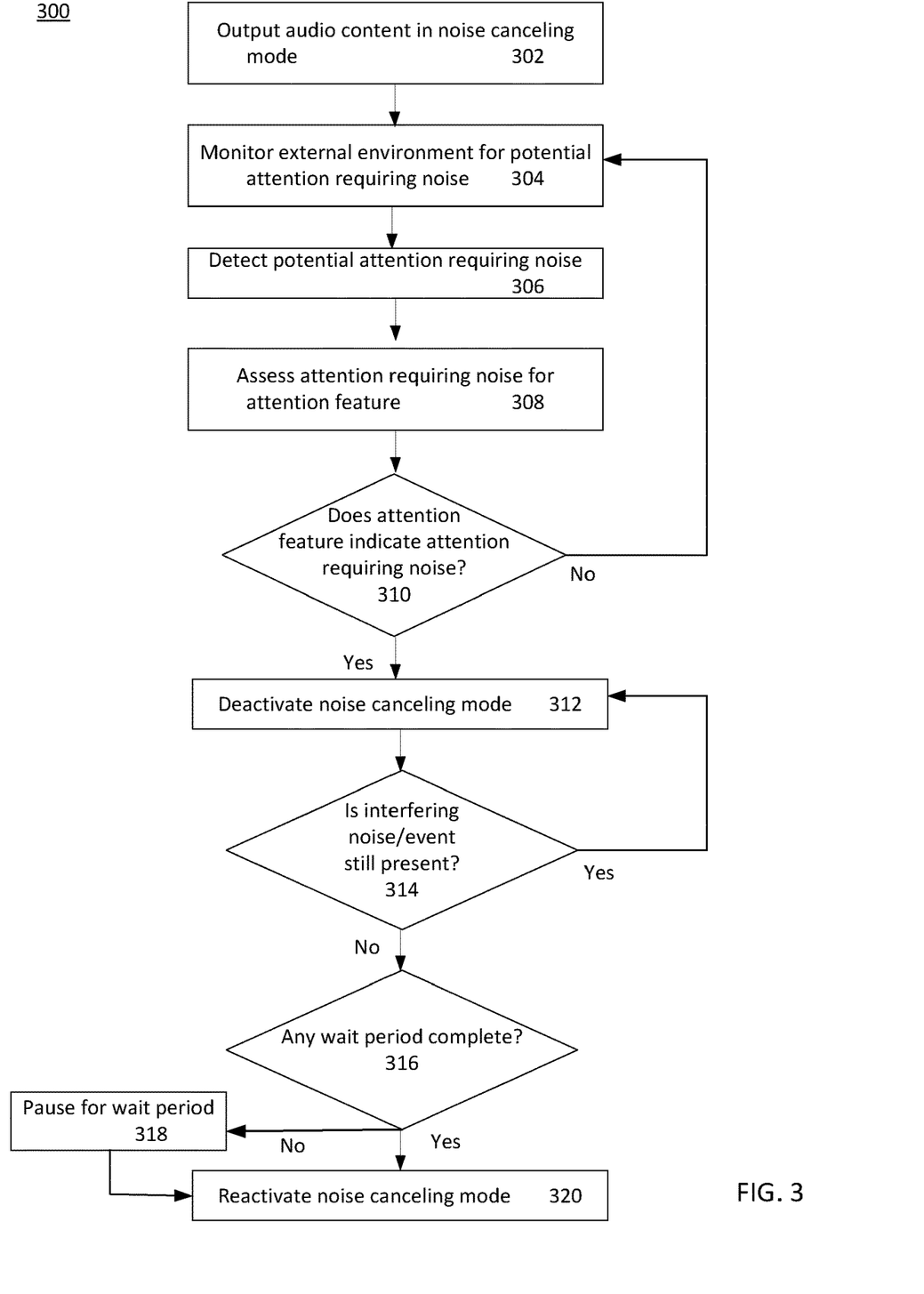
FIG. 3 is a flow diagram of an example method for identifying attention requiring noise, in accordance with some implementations.

FIG. 3 shows a flow chart of an override process 300 for the noise cancelation override system to identify and attention requiring noise, and may be performed, for example, by the audio player 204 of the override system 202 shown in FIG. 2.

In block 302, audio content is received, for example, via content provider 210 of FIG. 2 and outputted to the listener via a personal listening device in a noise canceling mode. In block 304, the environment of the listener is monitored by one or more sensors and/or microphones for potential attention requiring noises including visual or other sensors that detect attention features of such an attention requiring noise. In block 306, the microphone signals and/or sensor data are collected that indicate a potential attention requiring noise.

In block 308, assessment of the microphone signals and/or sensor data is performed to determine a presence of attention features that require a listener's attention related to the potential attention requiring noise.

In some implementations, attention features include various aspects of loudness levels of the external noise. Some of such methods of identifying attention requiring noises is described below with regard to FIG. 4.

In some implementations, one or more images are captured as sensor data by one or more cameras coupled to the personal listening device. Image recognition techniques, such as geometric recognition algorithm, photometric algorithms, recognition algorithms that use one or more of principal component analyses, linear discriminant analysis, elastic bunch graph matching, hidden Markov models, and dynamic link matching, may be performed on the one or more images to identify an object and/or gesture(s). It will be appreciated that other known or later developed recognition algorithms, techniques, and/or systems may be employed. Recognition algorithms may be incorporated into the audio player or provided by software that is external to noise cancelation override system and that system accesses.

The image recognition process may include comparing the object in the image with reference images to determine a match. Features of the object may be extracted for analysis, and compared to features of one or more reference images. For example, features may include relative position, size, and/or shape of object features such as facial characteristics, body characteristics, etc. In some implementations, image recognition may include normalizing multiple reference images, and compressing object data from those images into a composite representation having information (e.g., object feature data), and then compare the object in the image to the composite representation for facial recognition.

Through image recognition, the object and/or the gesture is found to indicate that the particular external noise includes the attention requiring noise that requires attention of the listener. Gestures can include a person other than the listener waving, pointing, jumping, or otherwise moving in a manner intended to gain attention of the listener.

At times, the gesture may include a person distant from the listener mouthing speech. In these cases, the speech of the person may be recognized by movement of lips, face and/or tongue of the person. The speech may be inputted to an attention AI model, such as an LLM. Output of the attention AI model may predict that the particular external noise includes the attention requiring noise requiring attention of the listener. Examples of lip reading techniques that may be employed by the noise cancelation override system are described in U.S. Publication No. 2023/0031536, entitled, Correcting Lip Reading Predictions, filed Jan. 10, 2022, the contents of which are incorporated by reference herein.

In some aspects of certain implementations of the method, identifying the attention requiring noise further comprises identifying that the particular external noise is speech of a particular person in a location of the listener. Image recognition software may be employed as described above to recognize a particular person. The identification of the person need not necessarily be identified, but that the same particular person repeatedly speaks to the listener or in the location of the listener. If it is determined that the same person speaks a threshold number of times that is more than once, within a predefined period of time, the noise may be identified as interfering with the audio content, triggering playback.

In some implementations, the speaking person may be identified as a person of importance to the listener according to stored listener characteristics. For example, the image of the person may be compared to stored images of persons characterized by level of importance to the listener. The speaking threshold number that is required to identify the attention requiring noise may be scaled based on the level of importance of the speaking person. For example, a person with a high importance may speak fewer times, e.g., twice, to meet the threshold, whereas a person with a low level of importance or unidentified may speak a greater number of times, e.g., 5 to meet the threshold.

In decision block 310, it is determined whether the detected attention features from block 308 satisfy criteria for identification of an attention requiring noise as described above.

If the attention feature(s) is found to identify the external noise as an attention requiring noise, the noise cancelation mode of the personal listening device is deactivated in block 312. For example, the audio player may transmit control signals to the personal listening device to turn of the noise canceling function. In some implementations, a notification of the deactivation of the canceling mode and/or notification of the attention requiring noise may be outputted to the listener.

If the attention requiring noise or attention requiring event associated with the attention requiring noise is still present in decision block 314, the process continues to turn off the noise canceling mode at block 312. If the attention requiring noise or an attention requiring event is found to have concluded in decision block 314, and a wait period has not yet expired, the process may pause for a wait period in block 316. The wait period may be set to zero (0) if there is no pause time needed before reactivating the noise canceling mode. If the wait period is not yet complete, the pause before reactivation continues in block 318. In some implementations, the listener may override the wait period to instruct the override system to immediately continue with noise cancelation. Once the wait period has been completed, the noise canceling mode resumes by reactivation in block 320.

Figure 4:
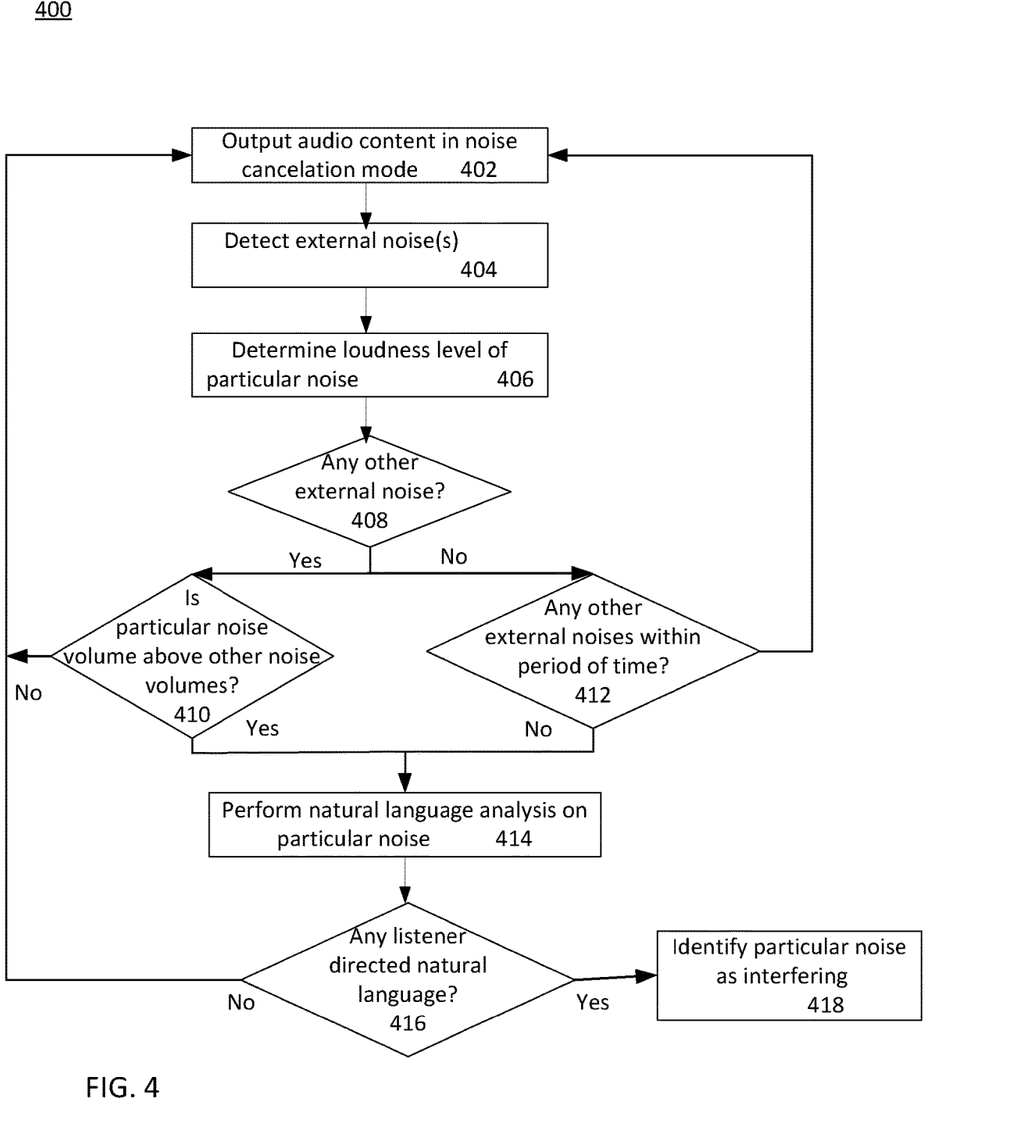
FIG. 4 is a flow diagram of various example method paths 4A-4C for identifying interfering noise by relative noise volume, in accordance with some implementations.

FIG. 4 is a flow chart of methods to identify an attention requiring noise by assessing loudness levels as attention features. The loudness level process 400 may be performed, for example, by the audio player 204 of the override system 202 shown in FIG. 2.

In block 402 audio content is outputted at play at a particular loudness volume level while the personal listening device is in a noise canceling mode. In some implementations, the loudness level of personal listening device may be predetermined or determined such as by decibel level or sound pressure level of the personal listening device. In block 404, external noises are detected in the environment of the listener. A loudness level of a particular external noise is determined through signals of the microphone(s).

At decision block 408 the process 400 searches for indications of additional external noises in addition to the particular noise in the listener environment. If no other external noises are detected, the process continues to decision block 412 to determine if any other external noises is detected over a defined quiet period of time. If no such external noises are detected for the quiet period such that the particular noise is the only detectable noise, then the process continues to block 414 described below.

Furthermore, if in decision block 412, it is found that there are additional detected external noises, the process moves to decision block 410. At decision block 410, it is determined whether the particular noise has a loudness volume level above (greater than) the loudness level of each individual other external noises detected to meet a noise threshold amount. If it is found that the particular noise is fails to be louder by the noise threshold amount, the particular noise is not identified as an attention requiring noise and the process returns to block 402 to output audio with the noise cancelation mode active. Otherwise if the particular noise loudness level is above the other noise level(s) by the noise threshold amount, the process continues to block 414.

At block 414, further assessment using natural language analysis may be performed on the particular noise. In decision block 416, the further assessment includes a determination of whether any listener directed natural language is detected in the particular noise. The received external noise signals from the microphone may be recorded and/or used to create data for analysis purposes. For example, the particular noise may include speech that is predicted by an attention AI model to be directed to the listener. The AI model may be a large language model (LLM) such as GTP3 or other such AI model capable of comprehensive natural language analysis. If the particular noise is found to include listener directed language, the particular noise is identified as an attention requiring noise in block 418 to trigger deactivation of the noise canceling mode. If there is no listener directed language in the particular noise, the process may return back to block 402 to continue playing the audio content with noise cancelation maintained.

In some implementations where the external noise is a person speaking, it may be determined that the person speaks in the presence of the listener a certain threshold number of times greater than one (such as a number between 3-10, or more specifically 5) within a predefined period of time, such as a 1-5 minute period. Where this repetitive speech threshold is met, the noise may be identified as requiring the listener's attention and thus is interfering.

The override system continues to monitor the external noise to detect when the external noise ceases for a predefined quiet period of time. For example, if an external noise is intermittent for and repeats after a short predefined quiet period, such as 1-2 seconds, the external noise may be considered to be still present. While the external noise is considered present, the audio content may be paused.

Figure 5:
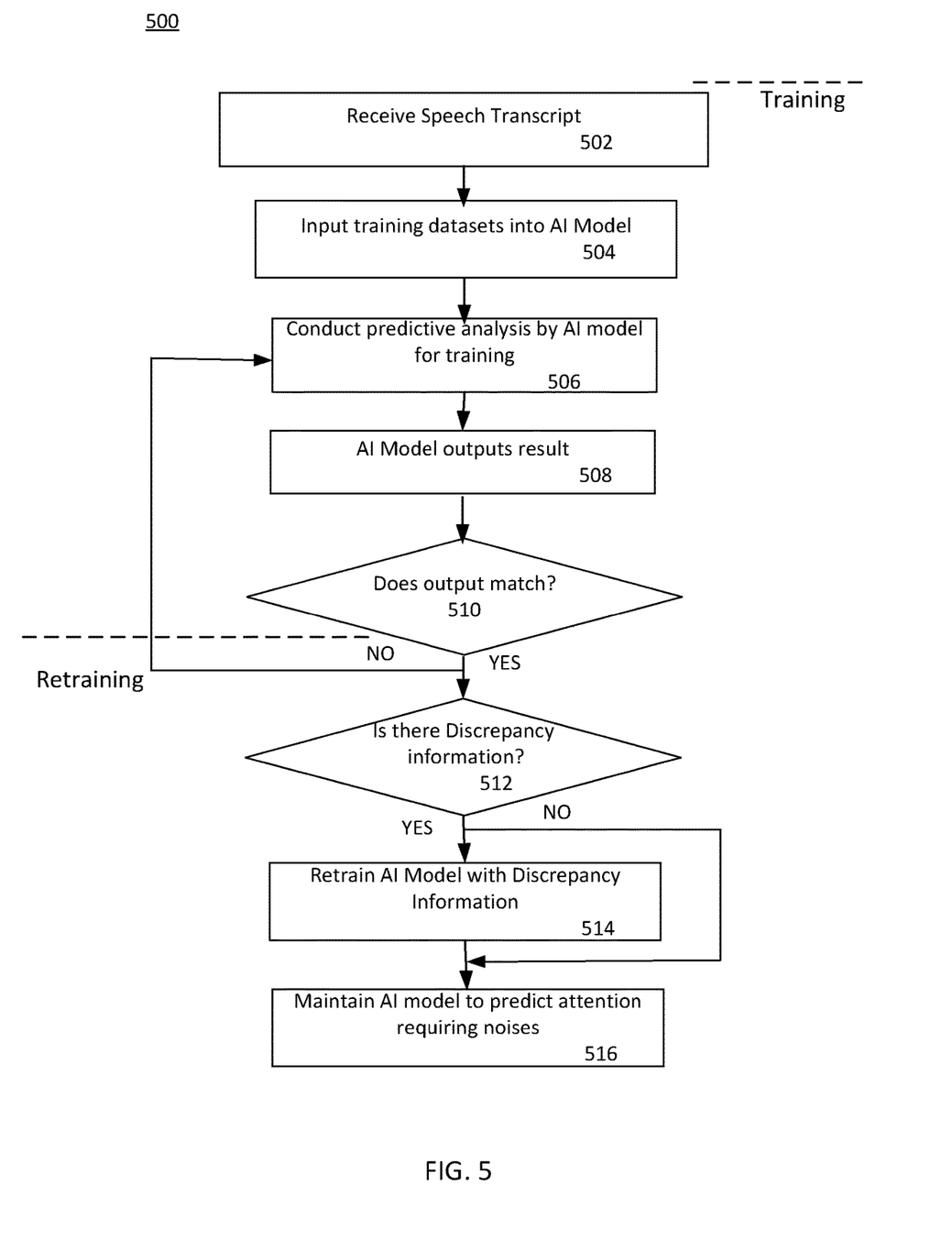
FIG. 5 is a flow diagram of an example method for training a speech artificial intelligence (AI) model for use in predicting speech indicative of attention requiring noise, in accordance with some implementations.

FIG. 5 is a flow chart of a process 500 for training an attention AI model for use in identifying attention requiring noises in the environment of listeners. In some implementations, the techniques to train the AI model may employ supervised classification algorithms, such as logistic regression algorithms. In some implementations, unsupervised or semi-supervised techniques may be employed.

In block 502, transcription of speech that may be present in an environment of a listener is received or otherwise accessed for assessment/training purposes. In block 504, training datasets including speech that requires attention of a typical listener is inputted into the AI model. The training datasets may also include labels of types of speech such as urgent event speech, listener directed speech, speech from a particular person of importance, etc., as well as associated attention time required for the types of speech. In some implementations, the training dataset may also include listener characteristics, such as demographics, hearing ability, etc.

In block 506, the AI model conducts predictive analysis using the training datasets. The training of the AI model may include determining patterns in types of speech, listener characteristics, etc., that leads to positive predictive results. Based on the analysis, the AI model outputs a result of the analysis, in block 508. The output result includes identification of attention requiring noise. The output result may also include additional parameters such as labels as urgent event speech and listener time required. Such additional parameters may be employed by the detection system to determine how long to pause the audio content before playback.

In decision block 510, the output result is compared with the training dataset inputted into the AI model and predetermined expected output result, to determine whether the output result matches. It is determined whether a threshold of success is achieved by the output result. The threshold of success may specify that some value equal to or less than 100% accuracy (such as 80%-90% success rate) is acceptable output results to be used. In some implementations, the output result may be used to dynamically change and enhance stored attention requiring noise samples.

If it is decided in decision block 510 that the output results match the training datasets to meet the threshold of success, the process continues. If there is a finding that the output results fail to match according to the threshold of success, the AI model is retrained by returning to block 506 and conducting predictive analysis again until the output result matches the training dataset. If a match is not achieved after a threshold number of tries, the analysis algorithm and/or training dataset may be assessed to find a solution to the failures.

In decision block 512, it is determined whether there is discrepancy information from prior AI model output results, in which the output of particular prompts was found to fail a threshold level of success in identifying attention requiring noises. Discrepancy information may include feedback from an external support resource, quality control studies, user survey data, accident reports, etc. The discrepancy information may be used for retraining in block 514. After discrepancy information retraining is complete, the process proceeds to decision block 516 described below.

If no discrepancy information is received, the process skips the discrepancy information retraining and continues to decision block 516 to maintain the AI model for future use in predicting attention requiring noises. For example, the AI model may be trained at a computer processing system independent from the audio player. The audio player may receive the AI model upon receiving the audio content to be outputted to the listener.

Some or all of the training/retraining process 500, or any other processes described herein, or variations and/or combinations of those processes, may be performed under the control of one or more computer systems configured with executable instructions and/or other data, and may be implemented as executable instructions executing collectively on one or more processors. In some implementations, training/retraining process 500 may include additional steps.

The methods of FIGS. 3, 4 and 5 described herein can be performed via software, hardware, and combinations thereof. For example, the process may be carried out in software, such as one or more steps of the process carried out by the noise cancelation override system. Although the description has been described with respect to particular implementations thereof, these particular implementations are merely illustrative, and not restrictive.

Figure 6:
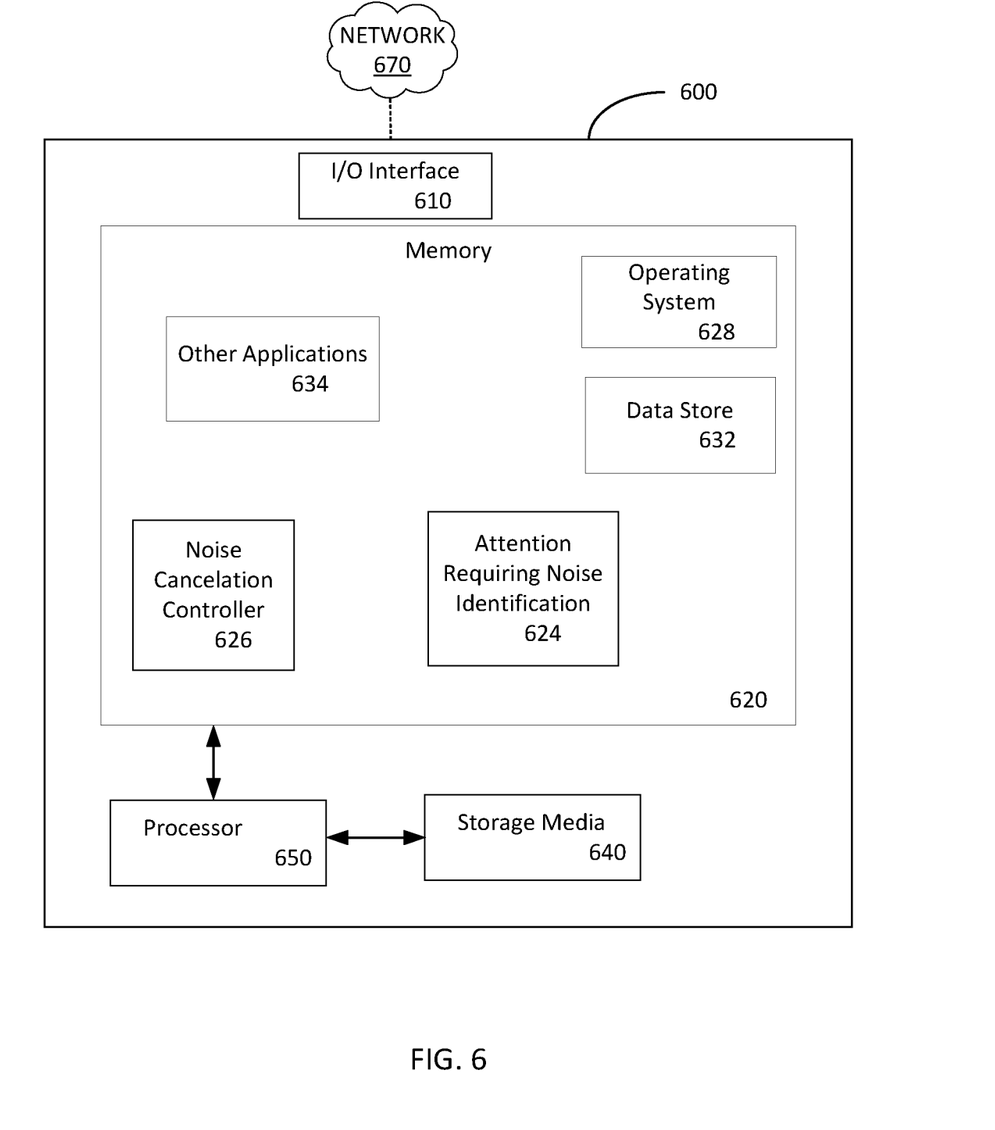
FIG. 6 is a block diagram of components of the noise cancelation override system usable to implement in the processes of FIGS. 3-4, in accordance with some implementations.

FIG. 6 is a block diagram illustrating an example computer device (also referred to as an apparatus) upon which aspects of the override system described herein, may be implemented. The computer device 600 represent an audio player, personal listening device, other override system components, or combinations thereof. Computer device 600 is merely illustrative and not intended to limit the scope of the claims. One of ordinary skill in the art would recognize other variations, modifications, and alternatives.

In one exemplary implementation, computer device 600 includes an I/O interface 610 (which may represent a combination of a variety of communication interfaces) that may include a network interface that receives information and data, such as audio content from a content provider (e.g., 210 in FIG. 2), input from a user, such as commands to pause, playback, skip forward, stop audio commands from the listener, noise related data, such as detection data from a microphone and/or sensor of the personal listening device (e.g., 206 in FIG. 2), and other information/data relevant to the override system processes. A network interface typically includes a network interface card, an Ethernet card, a modem (telephone, satellite, cable, ISDN), (asynchronous) digital subscriber line (DSL) unit, and the like. Further, a network interface may be physically integrated on a motherboard, may be a software program, such as soft DSL, or the like.

Computer device 600 may also include software that enables communications of I/O interface 610 over a network 670 such as HTTP, TCP/IP, RTP/RTSP, protocols, wireless application protocol (WAP), IEEE 902.11 protocols, and the like. In addition to and/or alternatively, other communications software and transfer protocols may also be used, for example IPX, UDP or the like. Communication network 670 may include a local area network, a wide area network, a wireless network, an Intranet, the Internet, a private network, a public network, a switched network, or any other suitable communication network, such as for example Cloud networks. Network 670 may include many interconnected computer systems and any suitable communication links such as hardwire links, optical links, satellite or other wireless communications links such as BLUETOOTH, WIFI, wave propagation links, or any other suitable mechanisms for communication of information. For example, network 670 may communicate to one or more mobile wireless devices, such as the audio player paired with the personal listening devices (e.g., headphone, earbud, hearing aid, etc.), mobile phones, tablets, and the like, via a wireless transceiver.

Computer device 600 typically includes familiar computer components such as a processor 650, and memory storage devices, such as a memory 620. A bus may interconnect computer components. While a computer is shown, it will be readily apparent to one of ordinary skill in the art that many other hardware and software configurations are suitable for use with the present invention Memory 620 may include solid state memory in the form of NAND flash memory and storage media 640. The computer device may include a microSD card for storage and/or may also interface with cloud storage server(s). In some implementations, computer device 600 is a smart phone having solid state memory. In some implementations, the computing device may be a portable computer having memory 620 as random access memory (RAM).

Memory 620 and storage media 640 are examples of tangible non-transitory computer readable media for storage of data, audio files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, cloud storage, and the like. A data store 632 may be employed to store various on-board data.

Computer device 600 includes one or more computer programs, such as software for noise assessment for identification of attention requiring noise 624 (e.g., 220 om FIG. 2) and noise cancelation controller 626 (e.g., 222 in FIG. 2) and various other applications 634 to perform operations described herein. Such computer programs, when executed by one or more processors, are operable to perform various tasks of methods including determine attention features in an environment and identifying attention requiring noises, as described above. The computer programs may also be referred to as programs, software, software applications or code, may also contain instructions that, when executed, perform one or more methods, such as those described herein. The computer program may be tangibly embodied in an information carrier such as computer or machine readable medium, for example, the memory 620, storage device or memory on processor 650. A machine readable medium is any computer program product, apparatus or device used to provide machine instructions or data to a programmable processor.

Computer device 600 further includes an operating system 628 to control and manage the hardware and software of the computer device 600. Any operating system 628, e.g., mobile OS, that is supports the noise cancelation override methods may be employed, e.g., IOS, Android, Windows, MacOS, Chrome, Linux, etc.

Although the description of the override system has been described with respect to particular embodiments thereof, these particular embodiments are merely illustrative, and not restrictive.

Any suitable programming language can be used to implement the routines of particular embodiments including IOS, Objective C, Swift, Java, Cotlin, C, C++, C#, JavaScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for responsive noise cancelation override, the method comprising:
   providing audio content to a personal listening device for output to a listener while the personal listening device is in a noise cancelation mode;
   receiving microphone signals and/or sensor data of at least one aspect of an environment of the listener, including detecting respective loudness levels of individual noises of multiple external noises;
   determining that the microphone signals and/or the sensor data include at least one attention feature, wherein one of the at least one attention feature is associated with a listener characteristic and another of the at least one attention feature is associated with an environmental characteristic;
   identifying that a particular external noise of the one or more external noises requires attention of the listener, based, at least in part, on the at least one attention feature by, at least in part:
   identifying that the particular external noise has a loudness level that is above the detected respective loudness levels of the other multiple external noises by a comparative threshold volume level; and
   deactivating the noise cancelation mode based, at least in part on identifying the attention requiring noise.

2. The method of claim 1, wherein the listener characteristic is selected from a group of: listener demographics, a particular hearing capability specific to the listener, and combinations thereof.

3. The method of claim 1, wherein the sensor data includes one or more images of one or more cameras coupled to the personal listening device, wherein identifying the attention requiring noise further comprises:
   performing image recognition on the one or more images to identify an object and/or a gesture; and
   determining that the object and/or the gesture indicates that the particular external noise includes the attention requiring noise.

4. The method of claim 3, wherein the gesture is identified and includes a person distant from the listener mouthing speech, and wherein identifying the attention requiring noise further comprises:
   predicting the speech of the person by recognizing movement of lips, face and/or tongue of the person; and
   determining, by an attention artificial intelligence (AI) model that the predicted speech indicates that the particular external noise includes the attention requiring noise.

5. The method of claim 1, wherein the output of the AI model includes a prediction of a type of noise of the attention requiring noise and the method further comprises:
   determining a wait period, in which a length of time of the wait period is based, at least in part, on the predicted type of the attention requiring noise;
   detecting that the attention requiring noise ceases, based, at least in part, on the microphone signals; and
   after the wait period, reactivating the noise canceling mode of the personal listening device.

6. The method of claim 1, wherein identifying the attention requiring noise further comprises:
   identifying that the particular external noise is speech of a particular person in a location of the listener; and
   detecting the particular person speaks a threshold number of repetitions within a predefined period of time, wherein the threshold number of repetitions is scaled based on a determined level of importance of the speaking person.

7. The method of claim 1, further comprising:
   providing to the personal listening device for output to the listener, a voice notification of a deactivation mode upon initiating deactivation, wherein the voice notification includes a description of a type of the attention requiring noise.

8. The method of claim 1, wherein identifying that a particular external noise of the one or more external noises requires attention of the listener is further by:
   inputting to an artificial intelligence (AI) model, audio data of the particular external noise and further inputting the listening characteristics selected from a group comprising: including at least one of: listener demographics, particular hearing ability of the listener, and/or environmental characteristics, selected from a group comprising: a hazard characteristic of the environment and an environmental composition characteristic,
   wherein the AI model is trained on speech that requires attention of a typical listener and various listener characteristic data and/or environment characteristic data, to perform predictive analysis;

receiving from the AI model, output comprising a prediction that the particular external noise includes the at least one attention feature that requires the attention of the listener.

9. An apparatus of a noise cancelation override system, the apparatus comprising:
one or more processors; and
logic encoded in one or more non-transitory media for execution by the one or more processors and when executed operable to perform operations comprising:
providing audio content to a personal listening device for output to a listener while the personal listening device is in a noise cancelation mode;
receiving microphone signals and/or sensor data of at least one aspect of an environment of the listener, including detecting respective loudness levels of individual noises of multiple external noises;
determining that the microphone signals and/or the sensor data include at least one attention feature, wherein one of the at least one attention feature is associated with a listener characteristic and another of the at least one attention feature is associated with an environmental characteristic;
identifying that a particular external noise of the one or more external noises requires attention of the listener, based, at least in part, on the at least one attention feature by, at least in part:
identifying that the particular external noise has a loudness level that is above the detected respective loudness levels of the other multiple external noises by a comparative threshold volume level; and
deactivating the noise cancelation mode based, at least in part on identifying the attention requiring noise.

10. The apparatus of claim 9, wherein the listener characteristic is selected from a group of: listener demographics, a particular hearing capability specific to the listener, and combinations thereof.

11. The apparatus of claim 9, wherein the sensor data includes one or more images of one or more cameras coupled to the personal listening device, wherein identifying the attention requiring noise further comprises:
performing image recognition on the one or more images to identify an object and/or a gesture; and
determining that the object and/or the gesture indicates that the particular external noise includes the attention requiring noise.

12. The apparatus of claim 11, wherein the gesture is identified and includes a person distant from the listener mouthing speech, and wherein identifying the attention requiring noise further comprises:
predicting the speech of the person by recognizing movement of lips, face and/or tongue of the person; and
determining, by an attention artificial intelligence (AI) model that the predicted speech indicates that the particular external noise includes the attention requiring noise.

13. The apparatus of claim 9, wherein identifying that a particular external noise of the one or more external noises requires attention of the listener is further by:
inputting to an artificial intelligence (AI) model, audio data of the particular external noise and inputting the listening characteristics selected from a group comprising: including at least one of: listener demographics, particular hearing ability of the listener, and/or inputting the environmental characteristics, selected from a group comprising: a hazard characteristic of the environment and an environmental composition characteristic,
wherein the AI model is trained on speech that requires attention of a typical listener and various listener characteristic data and/or environment characteristic data, to perform predictive analysis; and
receiving from the AI model, output comprising a prediction that the particular external noise includes the at least one attention feature that requires the attention of the listener.

14. A non-transitory computer-readable storage medium carrying program instructions thereon for responsive control of noise cancelation, the instructions when executed by one or more processors cause the one or more processors to perform operations comprising:
providing audio content to a personal listening device for output to a listener while the personal listening device is in a noise cancelation mode;
receiving microphone signals and/or sensor data of at least one aspect of an environment of the listener, including detecting respective loudness levels of individual noises of multiple external noises;
determining that the microphone signals and/or the sensor data include at least one attention feature, wherein one of the at least one attention feature is associated with a listener characteristic and another of the at least one attention feature is associated with an environmental characteristic;
identifying that a particular external noise of the one or more external noises requires attention of the listener, based, at least in part, on the at least one attention feature by, at least in part:
identifying that the particular external noise has a loudness level that is above the detected respective loudness levels of the other multiple external noises by a comparative threshold volume level; and
deactivating the noise cancelation mode based, at least in part on identifying the attention requiring noise.

15. The storage medium of claim 14, wherein the listener characteristic is selected from a group of: listener demographics, a particular hearing capability specific to the listener, and combinations thereof.

16. The storage medium of claim 14, wherein the sensor data includes one or more images of one or more cameras coupled to the personal listening device, wherein identifying the attention requiring noise further comprises:
performing image recognition on the one or more images to identify an object and/or a gesture; and
determining that the object and/or the gesture indicates that the particular external noise includes the attention requiring noise.

17. The storage medium of claim 16, wherein the gesture is identified and includes a person distant from the listener mouthing speech, and wherein identifying the attention requiring noise further comprises:
predicting the speech of the person by recognizing movement of lips, face and/or tongue of the person; and
determining, by an attention artificial intelligence (AI) model that the predicted speech indicates that the particular external noise includes the attention requiring noise.

18. The storage medium of claim 14, wherein the operations further comprise:
receiving the output of the AI model including a prediction of a type of noise of the attention requiring noise;

determining a wait period, in which a length of time of the wait period is based, at least in part, on the predicted type of the attention requiring noise;

detecting that the attention requiring noise ceases, based, at least in part, on the microphone signals; and after the wait period, reactivating the noise canceling mode of the persona listening device.

19. The storage medium of claim 14, wherein identifying that a particular external noise of the one or more external noises requires attention of the listener is further by:

inputting to an artificial intelligence (AI) model, audio data of the particular external noise and inputting the listening characteristics selected from a group comprising: including at least one of: listener demographics, particular hearing ability of the listener, and/or inputting the environmental characteristics, selected from a group comprising: a hazard characteristic of the environment and an environmental composition characteristic, wherein the AI model is trained on speech that requires attention of a typical listener and various listener characteristic data and/or environment characteristic data, to perform predictive analysis; and receiving from the AI model, output comprising a prediction that the particular external noise includes the at least one attention feature that requires the attention of the listener.

* * * * *